INVENTOR
SOUTHWICK W. BRIGGS
by Mason, Kolehmainen, Rathburn and Wyss
ATTORNEYS

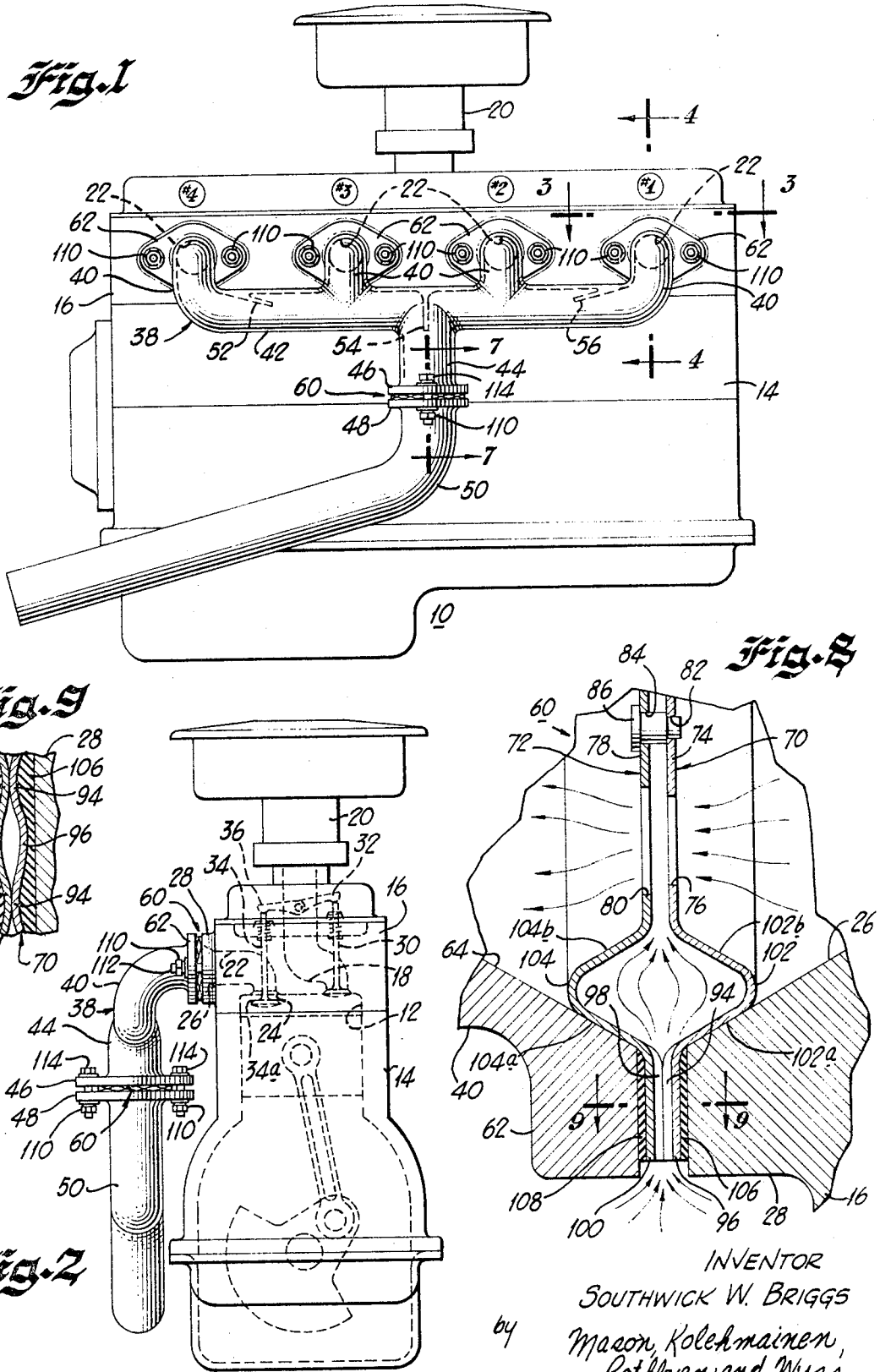

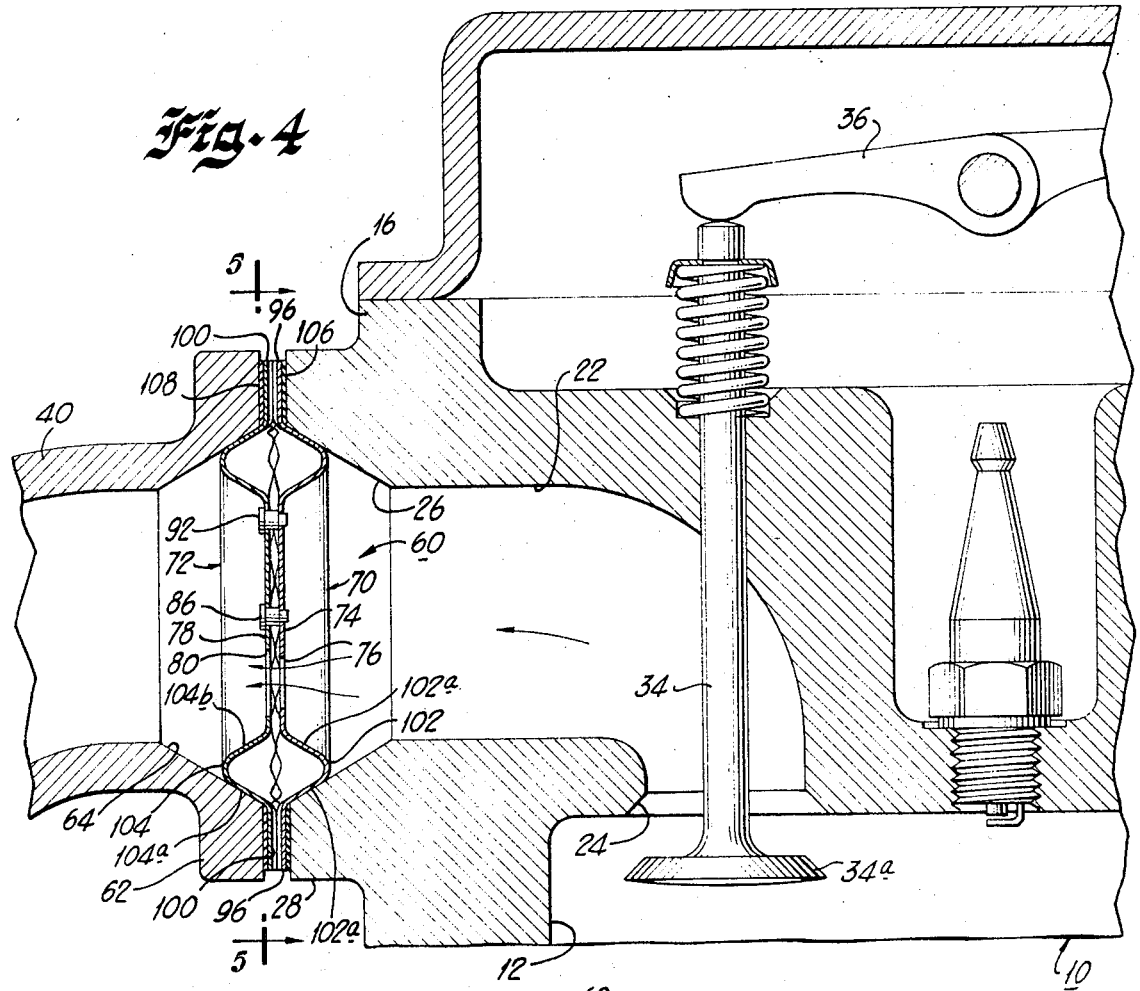
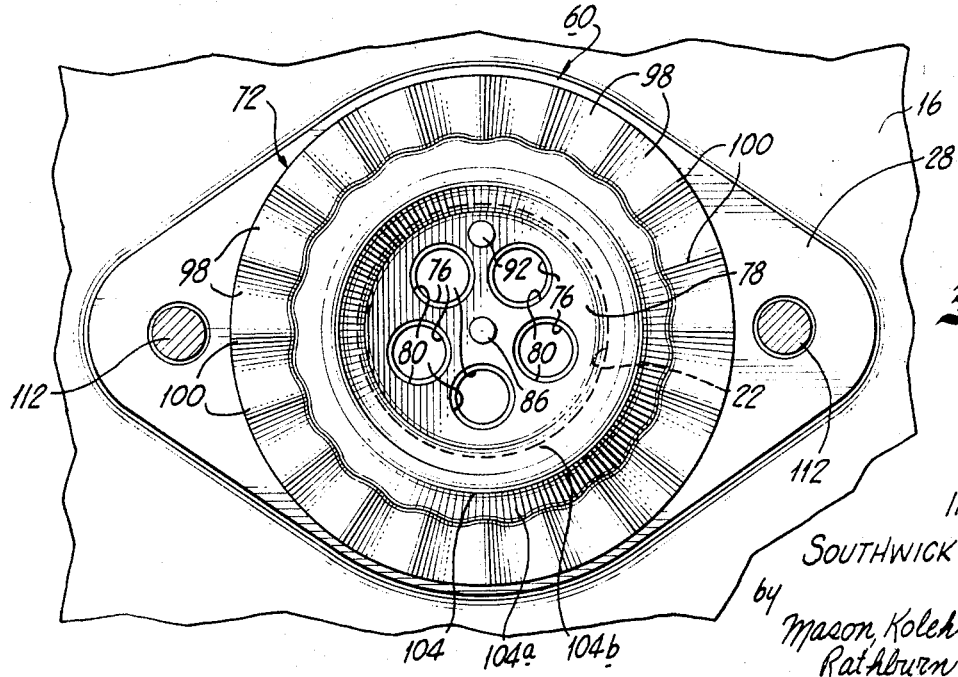

2,520,131
Patented July 14, 1970

3,520,131
EXHAUST GAS CONTROL
Southwick W. Briggs, 6420 Western Ave.,
Chevy Chase, Md. 20015
Filed Mar. 4, 1968, Ser. No. 710,104
Int. Cl. F01n 3/10
U.S. Cl. 60—30
14 Claims

ABSTRACT OF THE DISCLOSURE

Apparatus for reducing the pollution from exhaust gases flowing into the atmosphere from an exhaust conduit comprising a pair of closely spaced apart orifice plates disposed transversely across the path of gas flow in said conduit. Each of said plates includes at least one orifice opening therein substantially smaller than the flow area in said conduit and the openings in one orifice plate are in coaxial alignment with the orifice openings in the other and of different size to define a low mass venturi, thereby permitting exhaust gases to flow through aligned orifices at high velocity. Means are provided defining one or more outside air passages between the orifice plates, each passage having an outer end in communication with the atmosphere at the outer edge of the orifice plates for introducing a flow of outside air into the low pressure region developed by the high velocity gas flow through the aligned orifice openings. The outside air aids in further combustion and burning of the unburned components in the exhaust gas.

---

The present invention relates to air pollution control apparatus and is especially applicable to the reduction of air pollution emanating from the exhaust gases generated in internal combustion engines and other prime movers. The invention is useful whenever high temperature unburned combustible components are being discharged into the atmosphere and it is desired to further burn or oxidize these unburned components within the exhaust system provided.

One of the major problems facing society today is air pollution, and many government agencies and private businesses have been active in the field in order to reduce and control the large amount of pollution in the air, especially in the vicinity of urban areas. In a Department of Commerce study it is reported that air pollution produced by automobiles and other motor vehicles creates approximately 60 percent of the total air pollution in the atmosphere in the United States. The greatest source of pollution in the exhaust gases of motor vehicles is from carbon monoxide and unburned hydrocarbons, and the oxides of nitrogen, sulphur oxides, lead components, and particulate material make up the remaining source of pollution. Exhaust control devices are standard equipment on all 1968 automobiles sold in the U.S. and they should limit emissions to 275 parts per million of unburned hydrocarbons and 1.5% carbon monoxide compared with 900 p.p.m. and 3.5% for vehicles without such equipment.

Many devices have been suggested and tried in attempting to provide more complete combustion of the unburned hydrocarbons and carbon monoxide normally present in motor vehicle exhaust gases. However, in most instances these devices have been unsuccessful and have not been able to meet pollution control standards, particularly the standard developed by the California State Commission on Air Pollution.

It is an object of the present invention to provide new and improved workable apparatus for reducing the pollution emitted by exhaust gases of motor vehicles and other prime movers so as to reduce emission to not more than 50 p.p.m. of unburned hydrocarbons and 0.5% carbon monoxide.

Another object of the present invention is to provide a new and improved pulse-type, venturi pump for introducing controlled amounts of outside air into the flow of hot exhaust gases in existing vehicle exhaust systems to more completely reduce pollution therefrom by further oxidizing the unburned components therein.

Still another object of the present invention is the provision of a new and improved pollution control system for use with a multicylinder internal combustion engine for introducing a controlled amount of outside airflow into the exhaust system thereof for more completely burning or oxidizing the unburned components in the exhaust gases.

Yet another object of the present invention is to provide a new and improved apparatus of the character described which can be rapidly and easily installed on existing internal combustion engines with little modification and at relatively low cost.

Still another object of the present invention is to provide a new and improved pulse-type, venturi pump, pollution control device for introducing outside air into the exhaust gas flow in the exhaust system of an internal combustion engine wherein the device is simple of construction, easy to install, low in cost and extremely efficient in operation.

A still further object of the present invention is the provision of a new and improved apparatus for reducing air pollution having means for initiating complete combustion of the unburned constituents in the exhaust gases without appreciably affecting the engine power or cost of operation.

Another object of the present invention is the provision of a new and improved pulse-type, venturi pump, pollution control apparatus having means for maintaining a temperature range high enough to initiate and support combustion of the unburned constituents in the exhaust gases within the exhaust system, yet low enough so that excessive amounts of nitrous oxides and oxides of sulphur are not produced.

Still another object of the present invention is the provision of a new and improved pulse-type, venturi pump, of the character described for installation in the exhaust system of internal combustion engines and having a relatively low mass whereby a sufficiently high temperature is maintained in the system to initiate and sustain combustion of the unburned products in the exhaust gases even when the engine has just been started, or is idling or is operating in a low power range.

Yet another object of the present invention is the provision of a new and improved pulse-type, venturi pump, of the character described for use in an exhaust manifold system of an internal combustion engine to provide a first burning zone immediately adjacent the exhaust ports of the engine and a second burning zone downstream thereof to further insure complete combustion of the unburned components in the exhaust gas.

Still another object of the present invention is the provision of a new and improved pulse-type, venturi pump, of the character described employing a pair of low mass, spaced-apart orifice plates extending across the exhaust gas flow immediately adjacent the exhaust ports of the engine.

Another object of the present invention is the provision of a new and improved pulse pump, wherein the spaced-apart orifice plates have multiple orifices therein for producing venturi action to draw a controlled flow of outside air into the system for combustion of the unburned hydrocarbon in the exhaust gas.

Still another object of the present invention is to provide a venturi pulse pump of the type described, wherein the venturi forming orifice plates are of relatively low mass and become elevated in temperature during operation of the engine from idle to full power to a temperature range sufficient to initiate and sustain combustion of the unburned products in the exhaust flow.

Still another object of hte present invention is the provision of a pulse pump, pollution control system which can be easily and economically installed on existing internal combustion engines, resulting in a much lower output of pollutants into the atmosphere from the exhaust system of the engine over its complete range of operation.

The foregoing and other objects and advantages of the present invention are accomplished by a new and improved pulse pump for introducing a controlled flow of outside air into the hot exhaust gases in the exhaust system of an internal combustion engine. The pulse pump comprises a pair of closely spaced-apart, thin orifice plates disposed transversely across the flow path of the exhaust gases. Each of the plates icnludes one or more orifice openings substantially smaller than the flow area in the exhaust conduit whereby the exhaust gases are accelerated to high velocity as they flow throguh pairs of aligned openings in the spaced orifice plates. Means are provided defining a plurality of radial air passages between the orifice plates and the outer ends of the passages are in communication with the atmosphere externally of the engine exhaust system while the inner ends are in communication with the orifice openings, thereby affording a path for outside air to flow into the high velocity, low pressure region produced by the exhaust gas flowing through the orifices in the plates. The orifice plates are constructed of thin, heat resistant material and are maintained in a temperature range high enough to support and initiate combustion of the unburned components in the system even though the engine is idling or operating in a low power range, thereby insuring efficient operation over the entire operating range of the engine.

For a better understanding of the present invention, reference should be had to the following detailed description taken in conjunction with the accompanying drawings, wherein:

FIG. 1 is a side elevational view of a typical internal combustion engine having the air pollution apparatus of the present invention installed thereon;

FIG. 2 is a front end elevational view of the engine of FIG. 1 illustrating in more detail the installation of the air pollution control apparatus thereon;

FIG. 4 is a greatly enlarged fragmentary sectional view taken substantially along lines 4—4 of FIG. 1 illustrating the internal components of the pollution control apparatus of the present invention;

FIG. 5 is an enlarged sectional view taken substantially along lines 5—5 of FIG. 4 assuming that FIG. 5 shows the complete structure;

Figure 3:
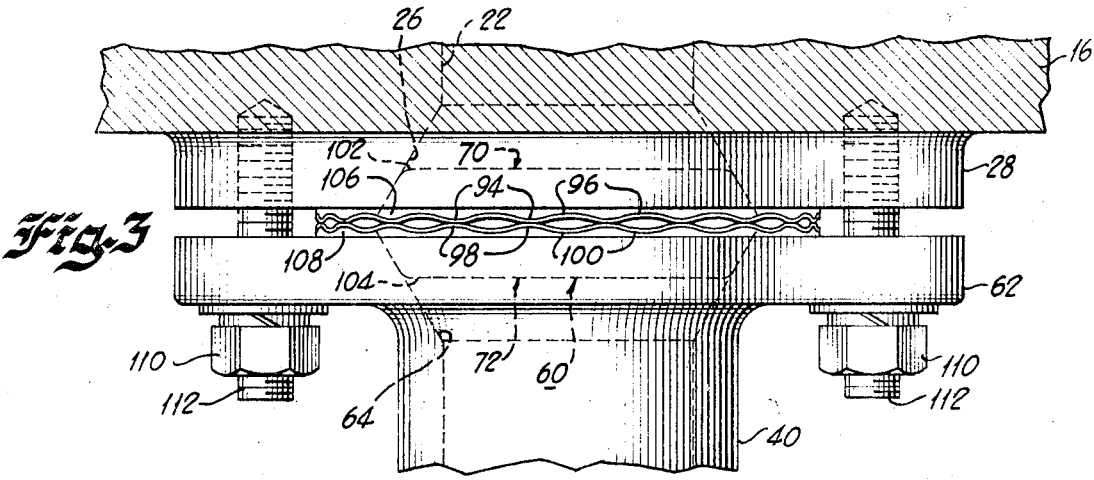
FIG. 3 is an enlarged fragmentary view taken substantially along lines 3—3 of FIG. 1 and illustrating the air pollution control apparatus as it is installed between an engine exhaust port and an exhaust manifold inlet branch.

FIG. 8 is an enlarged fragmentary view of a portion of FIG. 3 illustrating what occurs as a result of the action of the exhaust gases moving throguh the orifice plates, thereby producing a venturi action to draw in outside air for combustion of the unburned components in the exhaust gas, and FIG. 9 is a fragmentary sectional view taken substantially along lines 9—9 of FIG. 8 assuming that FIG. 8 shows the complete structure.

Referring now more particularly to the drawings, there is illustrated a more or less conventional internal combustion engine 10 having a plurality of cylinders 12 (FIG. 2) disposed in line along the engine block 14. The engine block 14 includes an upper head portion 16 defining the upper end portions of the cylinders 12 and defines a plurality of intake passages 18 for supplying a fuel air mixture to the cylinders 12 from a carburetor 20. Each cylinder 12 is provided with an exhaust passage 22 leading from a frustoconical valve seating surface 24 (FIGS. 2 and 4) at the upper end of the cylinder and terminating in a frustoconical exhaust port 26 defined on the side of the head portion 16 on an outwardly protruding integrally formed boss portion 28.

The flow of combustion air and fuel into each cylinder 12 from an associated intake passage 18 is controlled by an intake valve 30 actuated by a rocker arm 32 and the flow of exhaust gases from each cylinder is controlled by an exhaust valve 34 having a lower valve head 34a adapted to seat against the valve seat surface 24. The exhaust valves 34 are actuated by pivotal rocker arms 36 driven by a suitable cam shaft means (not shown) and both intake and exhaust valves in each cylinder are timed to open and close in accordance with the operative cycle of the engine. While the engine 10 is illustrated as having only four cylinders, it is to be understood that the pollution control apparatus of the present invention is applicable to single cylinder engines, sixes, V-eights, and, in general, to all types of prime movers including furnaces and boilers wherein the exhaust gases contain appreciable amounts of unburned constituents, such as hydrocarbons, and carbon monoxide.

The exhaust gases from the several exhaust ports 26 of the engine 10 are directed into a common exhaust manifold 38 having a plurality of inlet branches 40, each inlet branch being in communication with one of the inlet ports 26 at its inner end and integrally connected with a common, longitudinally extending collector pipe 42 at the outer end. The collector pipe 42 of the manifold is provided with one or more outlet branches 44 having a flanged outer end 46 adapted to be connected to a flange 48 on the engine end of an exhaust pipe 50 which eventually passes the hot exhaust gases to the atmosphere. A muffler (not shown) is normally provided downstream in the exhaust pipe to reduce noise of the gases flowing into the atmosphere.

All of the exhaust valves 34 in a multicylinder engine do not open and close in unison but, instead, operate in accordance with a preselected cycle based on the firing order of the cylinders in the engine, and in order to minimize back flow of the exhaust gases from one cylinder into another, the manifold collector pipe 42 is provided with a plurality of internal baffles 52, 54 and 56. The central baffle 54 retards the flow of exhaust gases from the forward pair of cylinders into the rearward portion of collector pipe 42 which serves the pair of rearward cylinders and helps to direct the gases from the forward cylinders into the outlet branch 44 of the manifold. The central baffle also retards flow from the rearward pair of cylinders into the forward end of the manifold in a similar fashion. The forward baffle 56 reduces back flow between the exhaust ports of the forward pair of cylinders and the rearward baffle 52 does likewise with respect to the rearward pair of cylinders.

In accordance with the features of the present invention, a pulse-type, venturi pump 60 is provided at the point of connection between each cylinder exhaust port 26 of the engine and its respective manifold inlet branch 40. The inlet end of each manifold inlet branch 40 is provided with a conventional integrally formed radial flange 62 shaped similarly to the facing projecting bosses 28 around the exhaust port on the side of the engine head 16, and the interior bore of each manifold branch is formed with a frustoconical surface 64 similar in shape and adapted to directly face the frustoconical surface of the adjacent exhaust port 26. A single secondary venturi pump 60 in accordance with the present invention is provided adjacent the connection between the outlet branch 44 of the manifold and the exhaust pipe 50, and, to accommodate the pump at this location, the interior bore of the branch 44 is formed with a frustoconical surface 66 which faces outwardly toward a matching frustoconical surface 68 formed in the end of the exhaust pipe.

Figure 6:
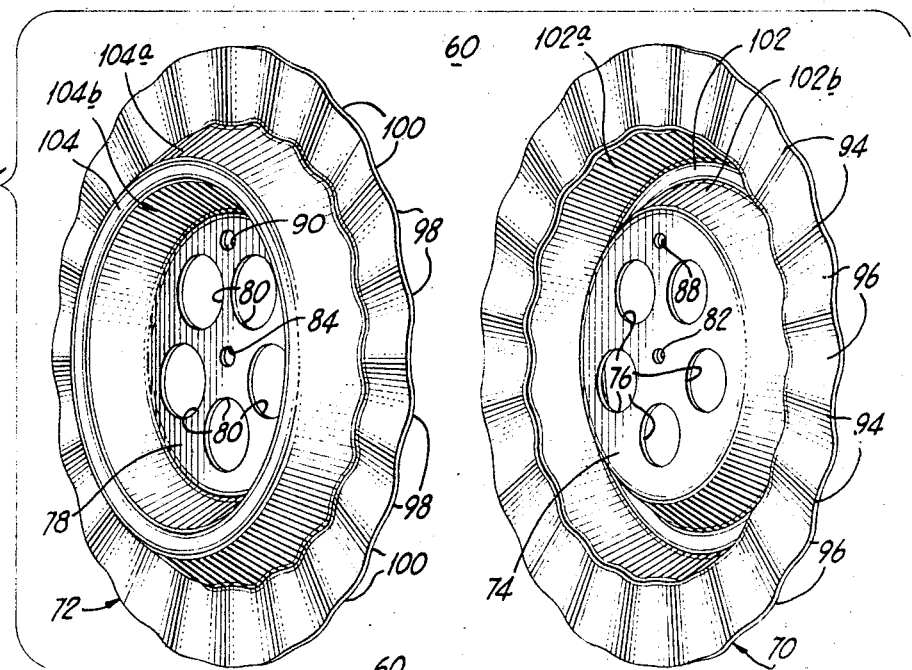
FIG. 6 is an exploded perspective view illustrating the principal components of the air pollution control device of the present invention.

Referring now particularly to FIG. 6, the venturi pulse pump 60 of the present invention includes a pair of circular orifice plates 70 and 72 constructed of thin, heat resistant, sheet material and formed to the shape illustrated, preferably, in a low cost stamping operation on a punch press or the like. Preferably, the plates 70 and 72 are formed of a high chrome stainless steel such as turbine blade steel. The upstream orifice plate 70 includes a circular, planar, central portion 74 having a diameter approximately equal to that of the exhaust passage 22 and the manifold inlet branches 50. Plate 70 includes a plurality of orifice openings 76 clustered in the central portion in a symmetrical, radially spaced arrangement with respect to the center thereof. Each orifice opening 76 is substantially smaller in area than the cross-sectional flow area in the exhaust passage upstream or downstream thereof, and the total area of all of the orifice openings in the orifice plate is significantly smaller than the flow area in the adjacent exhaust passages so that the velocity of exhaust gas flow through each orifice opening is increased substantially above the average gas velocity upstream or downstream of the pulse pump. In a device built in accordance with the present invention five openings 76, each three-eighths of an inch in diameter, were employed.

The downstream orifice plate 72 is formed with a circular, planar, central portion 78 approximately equal in diameter to the central portion 74 of the upstream orifice plate 70 and this central portion 78 is likewise provided with a similar number of orifice openings 80 arranged in a symmetrical pattern to lie in concentric relation with the respective orifice openings 76 on the upstream plate when the central portions 74 and 78 of the orifice plates are disposed in closely spaced parallel relation, as shown in FIGS. 3, 4, 6, 7 and 8. The orifice openings 80 are slightly larger in diameter than their counterparts 76 in the upstream orifice plate in order to accommodate a controlled amount of outside air which is drawn into the system between the orifice plates because of the venturi action of the exhaust gases flowing through each spaced pair of concentric orifice openings 76 and 80. In a device built in accordance with the present invention, five openings 80 each seven-sixteenths of an inch in diameter were employed.

In order to key the respective orifice plates 70 and 72 together in concentric relation so that the orifice openings 76 and 80 in each plate are disposed in concentrically aligned upstream and downstream pairs, the central, circular portions 74 and 78 of the orifice plates are provided with small, center openings 82 and 84, respectively, and a small headed rivet or pin member 86 is inserted through these openings (FIGS. 4, 7 and 8) to hold the members in concentric alignment with each other. In order to prevent relative rotation of the plates about the center pin 86 and insure accurate alignment between each pair of orifice openings 76 and 80, small eccentric openings 88 and 90 are formed in the respective center portions 74 and 78 of the orifice plates and a headed rivet or pin 92 is inserted into the openings, as best shown in FIGS. 4 and 5. Both of the pins or rivets 86 and 92 are formed with a stem portion having a middle section larger in diameter than the outer end portion and this middle section serves as a spacer to insure the proper spacing or clearance between the facing surfaces of circular, planar, central portions 74 and 78 of the orifice plates when assembled together. In a device built in accordance with the present invention, the spacing between the central portions 74 and 78 of the plates 70 and 72 was one-sixteenth of an inch and the thickness of each central portion was also one-sixteenth of an inch.

As the hot exhaust gases leaving the exhaust ports 26 of the engine flow through the pairs of aligned orifice openings 76 and 80 in the spaced-apart orifice plates, the velocity of flow is increased substantially and results in a lower static pressure or partial vacuum being produced between the orifice plates. Because of the partial vacuum produced by this venturi action, a controlled flow of outside air is drawn into the region and passes radially inward from around the outer periphery of the orifice plates. In order to provide a path for this outside airflow, the upstream orifice plate 70 is formed with a plurality of radially extending, alternate ridges 94 and grooves 96 and the downstream orifice plate 72 is formed with matching ridges 98 and grooves 100. The radially extending ridges and grooves are formed in annular rings or bands adjacent the peripheries of the orifice plates, and the bands surround and completely encircle the central flat, circular portions 74 and 78 of the orifice plates. The outer ends of the ridges and grooves extend to the outer periphery of the orifice plates and the inner ends terminate short of the circular central portions 74 and 78 but are in direct communication with enlarged annular grooves or cavities 102 and 104 formed in the respective plates radially outward of the central planar portions 74 and 78 thereof. When the orifice plates 70 and 72 are assembled together, as shown (FIGS. 4, 7 and 8), the annular cavities 102 and 104 directly face one another, thereby providing an enlarged annular chamber or manifold, immediately encircling or surrounding the central planar portions of the orifice plates. Accordingly, a substantial volume of outside air is continuously maintained in the annular chamber for immediate flow, radially inward between the planar central portions 74 and 78 to mix with the high velocity exhaust gases flowing between the aligned pairs of orifice openings 76 and 78. The radial passages formed between adjacent, facing, radially extending grooves 96 and 100 around the periphery of the respective orifice plates, continuously supply outside air to the enlarged annular chamber between the facing cavities 102 and 104, and the amount of air supplied is directly proportional to the rate of exhaust gas flow or power output of the engine. In a device built in accordance with the present invention the radial passages provided the equivalent of approximately eight one-quarter inch openings.

Each pulse-type, multiple venturi pump 60 comprises an upstream orifice plate 70 and a downstream orifice plate 72 assembled and keyed together with the rivets or pins 86 and 92, and the ridges 94 on the orifice plate 70 are in contact with the ridges 98 on the downstream orifice plate 72. Preferably, the ridges on the respective plates are spot welded together forming an integral pump unit which can be easily installed into an existing engine exhaust system. When an assembled pump unit 60 is inserted into the engine exhaust system adjacent each of the exhaust ports 26 and its respective inlet branch 40 of the manifold, the facing frustoconical surfaces 26 and 64 of the exhaust port and its associated inlet branch provide an annular space of generally triangular cross section for accommodating the enlarged annular grooves 102 and 104 in the respective orifice plates. The outer surfaces 102a and 104a of the orifice plates forming the grooves 102 and 104 are in direct contact with the respective frustoconical surfaces 26 and 64, and the inner surfaces 102b and 104b are in direct contact with exhaust gases flowing through the system. Because of this direct contact, the orifice plates become heated by the exhaust gases, and because of the relatively low mass and thin construction, the temperature is maintained in the 1200° F. to 1400° F. range, even though the flow from the exhaust port 26 is pulsating or intermittent. It has been found that when the temperature goes down to 1000° F. combustion of the unburned hydrocarbons will not take place. The volume of outside air maintained within the annular chamber formed by the cavities or grooves 102 and 104 is preheated, and when it passes into the exhaust gas flow through the respective pairs of aligned orifices 76 and 80, combustion of the unburned constituents in the exhaust gases is initiated and sustained.

Because of this construction and relatively low mass of the orifice plates 70 and 72, rapid heating results when the engine is initially started, and combustion of the unburned constituents in the exhaust gases takes place almost immediately. Moreover, even when the engine is idling or operating at low power settings, the orifice plates are maintained at a sufficient temperature to initiate combustion of the unburned components because of the relatively low mass and thin plate material. The multiple orifice openings 76 and 78 offer very little resistance to the exhaust gas flow from the exhaust ports 26 and, hence, the installation of the pulse pumps 60 on an engine have little effect on the power output because very little increase in back pressure is produced. The orifice openings, being open continuously, offer relatively little resistance to the flow of exhaust gases from the exhaust ports 26 into the manifold 38 and, in addition, provide additional baffling to retard back flow from one cylinder to the other through the manifold. If enough air is drawn between the plates 70 and 72 to burn substantially all of the hydrocarbons, the temperature of the plates will rise to 1800° to 1900° F. and cheap plate materials will not withstand these temperatures. Moreover, the emission of nitrous oxide with increase in temperature will also occur. It is for this reason that two pulse pumps in series are employed which also cut down on nitrous oxide emission.

The downstream pulse pump 60, mounted at the end of the outlet branch 44 of the manifold, operates in the same manner as the pumps at the exhaust ports; however, the former operates more on a continuous basis because the exhaust pulses from all of the engine cylinders reach this pump during the same time interval between single pulses on the latter pumps. Accordingly, sufficient temperature is maintained for ignition and combustion of the unburned constituents in the gases, even though the exhaust gases have been cooled somewhat by dilution by the time they reach the outlet branch of the manifold. In any event, because of the thin, low mass construction of the secondary pulse pump 60, the orifice plates 70 and 72 are maintained at a substantial temperature range for insuring further burning of any unburned hydrocarbons or carbon monoxide remaining in the exhaust gases at this region. Because the volume of flow through the single downstream pulse pump at the outlet of the manifold is on a more continuous basis than in the pulse pumps located adjacent the individual exhaust ports of the engine, the orifices in the downstream pump are preferably a little larger in diameter than their counterparts in the pumps adjacent the exhaust ports. In a system built in accordance with the invention, the orifices 76 in the orifice plates 70 of the downstream pulse pump 60 were constructed to be one-half inch in diameter and the facing orifices 80 were nine-sixteenths of an inch in diameter.

Figure 7:
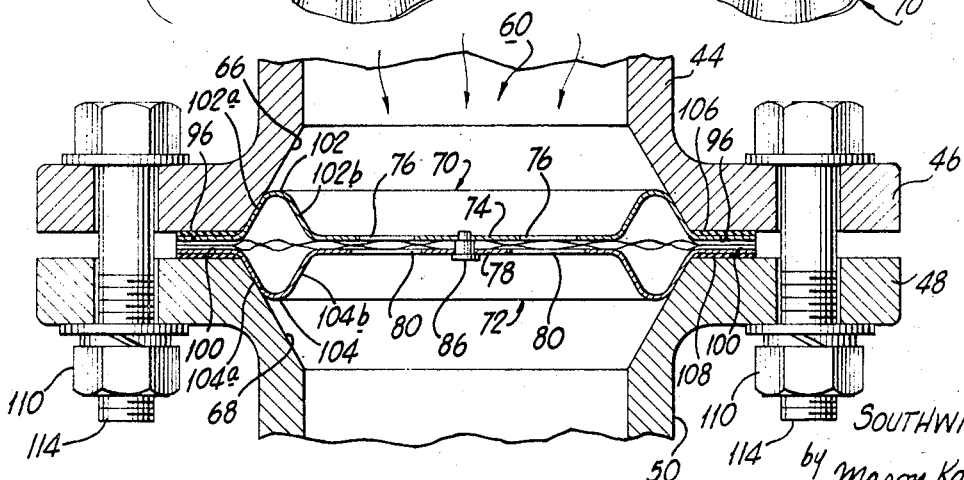
FIG. 7 is an enlarged fragmentary sectional view taken substantially along the line 7—7 of FIG. 1 illustrating an air pollution control apparatus in accordance with the invention installed between the outlet branch of the engine exhaust manifold and the exhaust pipe.

When installing the pulse pump 60 in place, as best shown in FIGS. 4 and 7, the annular bands of ridges and grooves around the periphery of the orifice plates 70 and 72 are seated between the radial faces of the respective facing flange members or the outer face of the boss member 28, as the case may be, and in order to prevent leakage of the exhaust gases between the radial faces of the flange members or boss 28, upstream and downstream gaskets 106 and 108, constructed of heat-resistant deformable material, are provided. As best shown in FIGS. 3 and 7, when the nuts 110 are tightened on the studs 112 and bolts 114, drawing the faces of the flanges and bosses together, the gaskets 106 and 108 are compressed and deformed to the shape of the ridges and grooves on the respective orifice plate members 70 and 72, as best shown in FIG. 9. Each pair of facing radial grooves 96 and 100 on the respective orifice plates forms a small radially inwardly extending air passage which is in communication with air outside or externally of the exhaust system and permits a controlled amount of outside air to flow into the annular preheat chamber formed between the annular cavities or grooves 102 and 104 in the respective facing orifice plates. The preheated air then flows radially inward and is mixed by venturi action into the high velocity exhaust gas flowing through the aligned pairs of orifice openings 76 and 80.

One of the problems associated with prior types of air injector systems used for reducing air pollution from motor vehicles is the fact that upon initial starting and during periods when the engine is idling or operating at low power settings, not enough heat is being generated to initiate and maintain combustion of the unburned hydrocarbon and carbon monoxides in the exhaust gas flow. However, with the present invention, because the orifice plates 70 and 72 are relatively thin and of low mass, they are rapidly heated to incandescent temperatures and, accordingly, combustion temperature is present almost immediately after engine starting and is maintained, even though the engine is idling or running at a lower power setting. Accordingly, the present invention provides high efficiency pollution control at the time of initial start-up and over the entire range of engine operation.

Another reason for the effectiveness of applicant's invention is the fact that the primary venturi pulse pumps 60 are located immediately adjacent the respective exhaust ports 26 on the engine and operate at temperatures in the 1300° to 1400° F. range, even at engine-idling conditions.

In testing a typical internal combustion engine having the air pollution control system as described herein installed thereon and the engine operating in the speed range of 600 to 3000 r.p.m. temperatures in the range of 1200° to 1400° F. were encountered in the exhaust gases flowing out of the exhaust ports 26. Immediately adjacent and downstream of the primary pulse pumps 60 in the inlet branches 40 of the manifolds, the temperature was found to vary in an operating range of 1200° to 1400° F. The heat developed by the burning of the hydrocarbons and carbon monoxide in the exhaust gas is believed to be balanced off by the diluting effects of the outside air and the expansion of the exhaust gas downstream in the manifold and the amount of unburned hydrocarbons and CO remaining in the exhaust gas was found to be significantly reduced. Furthermore, excessive amounts of oxides of sulphur and nitrogen were not present because the high temperatures of 1500° F. to 1800° F. at which these compounds are produced were not developed. The exhaust gas temperatures in the outlet branch 44 of the manifold were found to vary in range of about 1200° to 1300° F. and, in the region downstream of the secondary pulse pump 60 at the point of connection of the exhaust manifold outlet and the exhaust pipe 50, the temperature was found to range between 1100° to 1200° F. with the amount of unburned hydrocarbons and carbon monoxide being even further reduced.

The multiple orifice arrangement in the orifice plates of the pulse pumps 60 generates very little back pressure in the exhaust system of an engine and the performance or power output of the engine is not significantly reduced by installation of the pulse pumps in the exhaust system, in accordance with the present invention. Moreover, installation of the pulse pumps on an existing engine is relatively simple with very little needed in the way of modification. The pulse pumps 60 are simple in construction and can be manufactured at relatively low cost. It has been found that by using both primary and secondary pulse pumps of the type described, superior results are obtained in the reduction of carbon monoxide and unburned hydrocarbons over the results obtained in prior systems. However, improved results are achieved when only primary pumps are installed either at the engine exhaust ports or at the outlet branch of the manifold. When using a first set of primary pulse pumps 60 adjacent the exhaust ports of the engine for adding a controlled flow of outside air, the temperature range in the manifold downstream can be controlled to range between 1200° to 1400° F. with a reduction in the amount of nitrous and sulphur oxide compounds, which would be formed if higher temperatures were present. The secondary pulse pump 60 downstream of the exhaust ports adjacent the outlet of the manifold and the exhaust pipe, adds additional outside air to insure complete combustion of any remaining unburned hydrocarbons and carbon monoxide, without raising the temperature in the system downstream into the range where excessive amounts of nitrous and sulphur oxide compounds are formed.

Prior systems have used various types of venturi or pump arrangements for introducing air into an exhaust system without burning and reduction of the pollutants by air dilution alone has been achieved. However, in the present invention metered quantities of outside air are introduced and burning or further combustion of the unburned hydrocarbons and carbon monoxide within the manifold itself is achieved, instead of a mere dilution of the exhaust gases.

In order to meet present and future standards for air pollution control, as set up by the Federal Government and the various states (notably California), the pollution control apparatus should be effective immediately upon initial engine start-up, because at this time, while the engine is still relatively cool, excessively rich mixtures are used and, correspondingly, the exhaust products contain large quantities of unburned hydrocarbons, carbon, and carbon monoxide. By reducing the mass of the pulse pumps 60, in accordance with the present invention, the orifice plates 70 and 72 are heated rapidly and become operative immediately upon initial start-up as well as during idling and low power engine operation.

Because the aligned orifice openings 76 and 80 are continuously open, very little back pressure in the exhaust system is developed and, consequently, there is little or no effective reduction in the horsepower output of an engine having the pollution control apparatus of the present invention installed thereon. Moreover, the orifice plates of the pulse pumps 60 act as additional sound mufflers in addition to their primary function of reducing pollutants in the exhaust gases. The system of the present invention is readily installed on existing vehicle engines at a relatively low cost, and the costs of the pollution control devices are relatively low.

In a series of test runs with the same internal combustion engine using, first, no means to reduce the hydorcarbons in the exhaust gases, and then using several prior art devices, as well as the present invention, significant improvements were found with the present invention, as evidenced by the following data:

|  | Hydrocarbons in exhaust in parts per million | | | Percent CO | Percent $CO_2$ | $N^2O$, p.p.m. |
| --- | --- | --- | --- | --- | --- | --- |
|  | Full load | ½ load | Idling |  |  |  |
| Engine without any means for eliminating hydrocarbons | 420 | 230 | 800-900 | 6.35 | 9.21 | 140 |
| Same engine with prior art device for inserting air at valves | 22 | 11-12 | 210-230 | 1.45 | 12 | 200 |
| Same engine with pulse pump of present invention | 2.7-3 | 2.5 | 2.2 | 0.1 | 12.8 | 18-48 |

Although the present invention has been described with reference to a single illustrative embodiment thereof, it should be understood that numerous other modifications and embodiments can be devised by those skilled in the art that will fall within the spirit and scope of the principles of this invention.

What is claimed and desired to be secured by Letters Patent of the United States is:

1. Apparatus for reducing the pollution from exhaust gases flowing into the atmosphere from an exhaust conduit of an internal combustion engine, comprising a pair of closely spaced-apart, thin orifice plates disposed across the path of gas flow in said conduit, each of said plates including at least one orifice opening smaller than said conduit in alignment with an orifice opening in the other plate permitting high velocity gas flow therethrough, and at least one pair of spaced-apart, radially outwardly extending spacers on one of said plates defining one or more radial air inlet passages between said plates, each radial passage having an outer end in communication with the atmosphere for introducing outside airflow radially inwardly into the high velocity exhaust gas flowing through said aligned orifice openings.

2. The apparatus of claim 1 wherein said spacers comprise ridges integrally formed in the face of one orifice plate and spaced radially outwardly of said orifice openings around the perimeter thereof, said ridges disposed to contact the adjacent face of said other orifice plate.

3. The apparatus of claim 2 wherein a plurality of radial ridges are formed on said adjacent face of said other orifice plate in matching contact with the ridges on said one plate.

4. The apparatus of claim 1 wherein each of said orifice plates includes a plurality of said orifice openings spaced apart and clustered adjacent the central portion of said plate, the total area of said openings being less than the flow area of said conduit.

5. The apparatus of claim 4 wherein at least one of said orifice plates is formed with an annular cavity encircling said clustered orifice openings therein and disposed to face and extend outwardly away from said other orifice plates, said last mentioned means including at least one air passage having an inner end in communication with said cavity.

6. The apparatus of claim 5 wherein said last mentioned means comprises a plurality of alternate ridges and depressions extending radially outward of said cavity to the peripheral edge of said orifice plate.

7. A system for reducing the pollution from the exhaust conduit of an internal combustion engine having a plurality of exhaust ports and wherein said exhaust conduit includes a manifold having an outlet end in communication with a common exhaust pipe and a plurality of inlet branches, each inlet branch in communication with a respective one of said exhaust ports, first venturi means between each of said exhaust ports and an adjacent inlet branch of said manifold and second venturi means downstream of said first venturi means having an inlet side in communication with said outlet end of said manifold and an outlet side in communication with said common exhaust pipe, each of said first venturi means comprising a pair of closely spaced-apart, thin orifice plates disposed across the flow path of exhaust gases from an adjacent exhaust port, each of said orifice plates including at least one orifice opening smaller than said exhaust port and in alignment with the orifice opening in the other plate and at least one pair of spaced-apart, radially outwardly extending spacers on one of said plates defining one or more radial air passages between said plates, each passage having an outer end in communication with the atmosphere for introducing outside airflow radially inwardly into the exhaust gases flowing through said aligned orifice openings between said plates.

8. The system of claim 7 wherein said second venturi means comprises a pair of closely spaced-apart thin orifice plates disposed across the flow path of exhaust gases entering said exhaust pipe, each of said orifice plates including an orifice opening smaller than said pipe in alignment with the opening in said other plate and at least one pair of spaced-apart, radially outwardly extending spacer on one of said plates defining one or more radial air passages between said plates, each passage having an outer end in communication with the atmosphere for introducing outside air flow radially inwardly into the exhaust gases flowing through said aligned orifice openings between said plates.

9. The system of claim 7 including baffle means in said manifold for reducing back flow of the exhaust gases from one inlet branch into another inlet branch.

10. A pulse-type venturi pump for introducing outside air into the flow of hot exhaust gases in an exhaust passage, thereby initiating more complete combustion of said gases comprising a pair of thin orifice plates in closely spaced-apart facing relation disposed transversely across the flow path of said gases, each of said plates having one or more orifice openings therein substantially smaller than the flow area of said exhaust conduit, said orifice openings in one plate being disposed in coaxial alignment with those in the other, and at least one pair of spaced-apart radial spacer means on one of said plates defining at least one radially extending air passage between said plates in communication between said orifice openings in said plates and the outside air around the outer edge of said plates.

11. The venturi pump of claim 10 wherein said spacer means comprises an annular band of alternate grooves and ridges formed on at least one of said orifice plates encircling said orifice openings therein.

12. The venturi pump of claim 11 wherein said orifice plates are formed of heat-resistant material, each having a plurality of said orifice openings therein in symmetrical spaced relation with respect to the central flow axis of said conduit.

13. The venturi pump of claim 12 wherein said orifice openings in the downstream orifice are larger than said orifice openings in the upstream orifice plate.

14. The venturi pump of claim 12 wherein at least one of said orifice plates is formed with an annular groove therein around said orifice openings and in communication with the inner ends of said passages.

References Cited

UNITED STATES PATENTS

| | | | |
|---|---|---|---|
| 939,844 | 11/1909 | Lehmann | 60—30 |
| 2,263,318 | 11/1941 | Tifft | 60—30 |
| 2,677,231 | 3/1954 | Cornelius | 60—30 |

FOREIGN PATENTS

| | | |
|---|---|---|
| 151,557 | 5/1904 | Germany. |
| 352,912 | 8/1931 | Great Britain. |
| 386,901 | 1/1933 | Great Britain. |
| 739,715 | 11/1955 | Great Britain. |

DOUGLAS HART, Primary Examiner

U.S. Cl. X.R.

230—95